United States Patent
O'Kane et al.

(10) Patent No.: US 10,227,507 B2
(45) Date of Patent: Mar. 12, 2019

(54) ANAEROBIC CURABLE COMPOSITIONS

(71) Applicant: Henkel IP & Holding GmbH, Duesseldorf (DE)

(72) Inventors: Ruairi O'Kane, Dublin (IE); Deirdre Ledwith, Dublin (IE); Aimee Hynes, Dublin (IE); Andrew D. Messana, Newington, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 16 days.

(21) Appl. No.: 15/723,258

(22) Filed: Oct. 3, 2017

(65) Prior Publication Data

US 2018/0057713 A1 Mar. 1, 2018

Related U.S. Application Data

(63) Continuation of application No. PCT/US2016/014706, filed on Jan. 25, 2016.

(60) Provisional application No. 62/142,641, filed on Apr. 3, 2015.

(51) Int. Cl.
| | |
|---|---|
| *C09J 4/00* | (2006.01) |
| *C08L 35/02* | (2006.01) |
| *C09J 11/06* | (2006.01) |
| *C08F 222/10* | (2006.01) |
| *C08K 5/00* | (2006.01) |

(52) U.S. Cl.
CPC ............ *C09J 4/00* (2013.01); *C08L 35/02* (2013.01); *C09J 11/06* (2013.01); *C08F 2222/1013* (2013.01); *C08K 5/0008* (2013.01)

(58) Field of Classification Search
CPC ........................................................ C09J 4/00
See application file for complete search history.

(56) References Cited

U.S. PATENT DOCUMENTS

| | | | |
|---|---|---|---|
| 6,835,762 | B1 | 12/2004 | Klemarczyk et al. |
| 6,897,277 | B1 | 5/2005 | Klemarczyk et al. |
| 6,958,368 | B1 | 10/2005 | Klemarczyk et al. |
| 2016/0251371 | A1* | 9/2016 | Misske .............. C07D 493/04 526/268 |

FOREIGN PATENT DOCUMENTS

| | | |
|---|---|---|
| EP | 2808361 | 12/2014 |
| JP | S5276345 | 6/1877 |
| WO | 1999001484 | 1/1999 |
| WO | 2013066461 | 5/2013 |
| WO | 2014114534 | 7/2014 |

OTHER PUBLICATIONS

International Search Report issued in connection with International Patent Application No. PCT/US2016/014706 dated Jun. 9, 2016.
R.D. Rich, "Anaerobic Adhesives" in Handbook of Adhesive Technology, 29, 467-79, A. Pizzi and K.L. Mittal, eds., Marcel Dekker, Inc., New York (1994).

* cited by examiner

*Primary Examiner* — Daniel H Lee
(74) *Attorney, Agent, or Firm* — Steven C. Bauman

(57) ABSTRACT

Anaerobic curable compositions are provided, which comprise a (meth)acrylate component, at least a portion which comprises (meth)acrylate-functionalized isosorbide, and methods of their production and use.

11 Claims, 5 Drawing Sheets

ANAEROBIC CURABLE COMPOSITIONS

BACKGROUND

Field

The invention provides anaerobic curable compositions comprising a (meth)acrylate component, at least a portion of which comprises (meth)acrylate-functionalized isosorbide, and methods of their production and use.

Brief Description of Related Technology

Anaerobic adhesive compositions generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Anaerobic adhesive compositions in the form of thread locker products have been used extensively to lock various bolts and nuts to prevent them from becoming loose during use. In general, anaerobic thread locker products offer good curing speed and produce required torque strength after cure on ferrous metal surfaces. However, when the bolts and nuts are made from steel and remain covered with oil left over from their manufacture, the curing speed of a medium strength anaerobic adhesive, for instance, may be compromised and the torque strength of the cured anaerobic adhesive may not be optimal. It would be a significant commercial advantage if the cure speed and torque strength could be improved, particularly when the substrates to be bonded have oily surfaces.

Conventionally, the raw materials used in the formulation of anaerobic adhesive compositions have come from petroleum feed stock. Recently, there have been efforts to identify cyclic molecules derived from sustainable carbohydrate raw materials. Isosorbide is one of these compounds with a fused biaryl ring system, two hydroxyl groups, and one on either side of the biaryl structure creating a diol.

It would desirable to increase the amount of raw materials in these anaerobic adhesive compositions that instead come from bio-renewable sources.

SUMMARY

That advantage is provided here through the use of derivatized biorenewable materials, such as (meth)acrylate-functionalized isosorbide.

In one aspect, the invention provides an anaerobically curable composition, which includes:
(a) at least one (meth)acrylate component;
(b) an anaerobic cure system; and
(c) (meth)acrylate-functionalized isosorbide.

The invention provides in another aspect a method for using an anaerobically curable composition. Here, the method includes:
providing an anaerobically curable composition comprising at least one (meth)acrylate component, an anaerobic cure system, and a (meth)acrylate-functionalized isosorbide;
providing two or more substrates, each of which having at least one complimentary surface;
applying the anaerobically curable composition to at least one of the complimentary surfaces of the substrates; and
mating the complimentary surfaces of the substrates such that the anaerobically curable composition is disposed therebetween such that an anaerobic environment is present so as to permit cure of the anaerobically curable composition.

DETAILED DESCRIPTION

Figure 1:
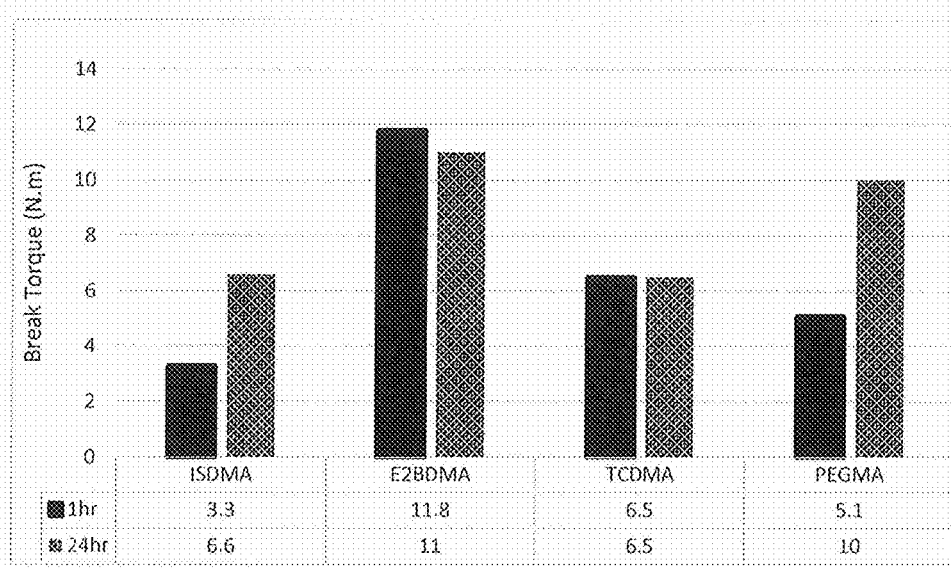
FIG. 1 depicts a plot of break torque measured in N·m over time measured at intervals of 1 hour and 24 hours for anaerobically curable compositions, one of which having (meth)acrylate-functionalized isosorbide as a component thereof.

As noted above, the invention provides in one aspect an anaerobically curable composition, which includes:

(a) at least one (meth)acrylate component;
(b) an anaerobic cure system; and
(c) (meth)acrylate-functionalized isosorbide.

The invention provides in another aspect a method for using an anaerobically curable composition. Here, the method includes:

providing an anaerobically curable composition comprising at least one (meth)acrylate component; an anaerobic cure system; and (meth)acrylate-functionalized isosorbide;

providing two or more substrates, each of which having at least one complimentary surface;

applying the anaerobically curable composition to at least one of the complimentary surfaces of the substrates; and mating the complimentary surfaces of the substrates such that the anaerobically curable composition is disposed therebetween such an anaerobic environment is present so as to permit cure of the anaerobically curable composition.

(Meth)acrylate monomers suitable for use as the (meth)acrylate component may be chosen from a wide variety of materials, such as those represented by $H_2C=C(G)CO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Other (meth)acrylate monomers may also be used, such as reaction products of the diglycidylether of bisphenol-A with methacrylic acid and a (meth)acrylate ester corresponding to structure as shown below:

$$H_2C=C(R^5)-C(O)-O-(CH_2)_m-\left[\left(C(R^4)(R^6)-C(R^4)\right)_v-C(R^4)-O\right]_n-C(O)-C(R^5)=CH_2$$

where $R^4$ may be selected from hydrogen, alkyl groups having from 1 to about 4 carbon atoms, hydroxyalkyl groups having from 1 to about 4 carbon atoms or $$-CH_2-O-C(O)-C(R^5)=CH_2$$

$R^5$ may be selected from hydrogen, halogen, and alkyl groups of from 1 to about 4 carbon atoms;

$R^6$ may be selected from hydrogen, hydroxy and $$-CH_2-O-C(O)-C(R^5)=CH_2$$

m is an integer equal to at least 1, e.g., from 1 to about 8 or higher, for instance, from 1 to about 4;

v is 0 or 1; and n is an integer equal to at least 1, e.g., 1 to about 20 or more.

Of course, combinations of these (meth)acrylate monomers may also be used.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Of course, combinations of these (meth)acrylate monomers may also be used.

The (meth)acrylate component comprises generally from about 10 to about 90 percent by weight of the total composition, preferably about 50 to about 90 percent by weight, and typically about 55 percent by weight percent to about 85 percent by weight percent, based on the total weight of the composition.

The invention provides a method for preparing an anaerobically curable composition. In this aspect, the method includes Providing at least one (meth)acrylate component; an anaerobic cure system; and (meth)acrylate-functionalized isosorbide, and Mixing together these constituents to prepare an anaerobically curable composition.

The invention provides in another aspect a method for using an anaerobically curable composition. Here, the method includes:

providing an anaerobically curable composition comprising at least one (meth)acrylate component; an anaerobic cure system; and (meth)acrylate-functionalized isosorbide;

providing two or more substrates, each of which having at least one complimentary surface;

applying the anaerobically curable composition to at least one of the complimentary surfaces of the substrates; and mating the complimentary surfaces of the substrates such that the anaerobically curable composition is disposed therebetween such an anaerobic environment is present so as to permit cure of the anaerobically curable composition.

The (meth)acrylate-functionalized isosorbide is prepared from isosorbide, which is derived from bio-renewable feed stocks. The (meth)acrylate-functionalized isosorbide is prepared by using either via a methacrylic anhydride route or via a transesterification with ethyl methacrylate route.

Thus, in another aspect, an anaerobically curable composition is provided that comprises:

a (meth)acrylate component in the amount of about 50 percent by weight to about 90 percent by weight of the total composition;

an anaerobic cure system in the amount of about 0.1 percent by weight to about 5.0 percent by weight of the total composition; and (meth)acrylate-functionalized isosorbide in an amount of about 1.0 percent by weight to about 40.0 percent by weight of the total composition.

In another aspect, a method of preparing an adhesive composition is provided that comprises:

(a) forming a composition comprising:
  (i) at least one (meth)acrylate component in the amount of about 50 percent by weight to about 90 percent by weight of the total composition; and
  (ii) an anaerobic cure system in the amount of about 0.1 percent by weight to about 5.0 percent by weight of the total composition; and
(b) combining the composition with (meth)acrylate-functionalized isosorbide in an amount of 1.0 percent by weight to about 40.0 percent by weight.

The anaerobic cure system includes at least one cure initiator and at least one cure accelerator.

Examples of suitable cure initiators are peroxides such as cumene hydroperoxide, tetramethylbutyl hydroperoxide, tert-amylhydroperoxide, para-menthane hydroperoxide, t-butyl hydroperoxide ("TBH") and t-butyl perbenzoate. Other suitable peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Examples of suitable cure accelerators are tetrahydroquinoline and alkylated tetrahydroquinoline, such as methyl tetrahydroquinoline, and those listed, for example, in U.S. Pat. No. 6,835,762 (Klemarczyk), U.S. Pat. No. 6,897,277 (Klemarczyk) and U.S. Pat. No. 6,958,368 (Klemarczyk).

More specifically, the components of the anaerobic cure system comprise cumene hydroperoxide, tetramethylbutyl hydroperoxide and/or tert-amylhydroperoxide, tetrahydroquinoline and/or alkylated tetrahydroquinoline, each in an amount effective to trigger anaerobic cure when exposed to conditions substantially devoid of oxygen.

The effective amount of the components of the anaerobic cure system should be in the range of about 0.1 percent by weight to about 5.0 percent by weight of the total composition. Each of the cure initiator and cure accelerator may be present in amounts of about 0.1 percent by weight to about 5 percent by weight (e.g., about 0.1 percent by weight to about 3 percent by weight) of the total composition but their total weight together does not exceed about 0.1 percent by weight to about 5 percent by weight of the total composition.

The inventive compositions may also include other conventional components, such as inhibitors of free radical generation, as well as metal catalysts, such as iron and copper.

EXAMPLES

Example 1

Synthesis of Isosorbide Dimethacrylate

Via Methacrylic Anhydride

Following the synthesis set out in *J. Mater. Chem A*, 1, 12579-86 (2013), isosorbide (50.0 g, 342.1 mmol) and 4-dimethyl amino pyridine ("DMAP") (4.18 g, 34.21 mmol) were suspended in dichloromethane (200 mL) and cooled to 0° C. before methacrylic anhydride (110.75 g, 718.4 mmol) was added slowly with stirring. The reaction mixture was allowed to adapt to room temperature and stirred for a period of 18 hours. The reaction mixture was then quenched with aqueous sat. NaHCO$_3$ (300 mL) and then stirred vigorously for 30 minutes before the layers were partitioned. The organic phase was sequentially washed with aqueous saturated NaHCO$_3$ (2×300 mL), water (300 mL) and brine (300 mL) and dried over MgSO$_4$. The so treated organic phase was concentrated under reduced pressure to yield a pale yellow oil. (92.14 g, 326.6 mmol, 97.19% yield).

Via Transesterification with Ethyl Methacrylate

The reaction was carried out using the selective distillation process (one heated condenser), one cooling with water and one heating with oil. Isosorbide (25.0 g, 171.1 mmol) and ethyl methacrylate (5.71 g, 49.9 mmol) were placed into a three necked round bottom flask. Toluene (100 mL) was added to the mixture and the RBF was placed into a heating mantle with the distillation apparatus. When the reaction temperature reached 110° C. chlorotriisopropoxytitanium (0.4 g) was added to the reaction.

Example 2

Evaluation of Isosorbide Dimethacrylate in Anaerobically Curable Compositions

Isosorbide dimethacrylate ("ISO DMA") was placed into a model formulation as the monomer instead of certain commonly used (meth)acrylates [that is, ethoxylated bisphenol A dimethacrylate ("E2BDMA"), tricyclodecane dimethacrylate ("TCDMA") and polyethylene glycol dimethacrylate ("PEGMA")] in an otherwise identical compositions. The four compositions were evaluated for relative performance. Table 1 below shows the constituents of the model formulation.

| Constituent | Amt/wt % |
|---|---|
| Monomer | 96.15 |
| EDTA | 0.70 |
| Maleic Acid | 0.65 |
| Saccharin | 1.00 |
| APH | 0.50 |
| CHP | 1.00 |

Reference to FIG. 1 illustrates break torque values on black oxide bolts and mild steel nuts measured after curing at room period at two time periods—1 hour and 24 hour cure.

ISO DMA was also used in two commercial thread locker products—LOCTITE 270 and LOCTITE 278—instead of the difunctional (meth)acrylate which is a regular constituent of these products. In LOCTITE 278, ISO DMA was formulated as a replacement for both TCDMA and E2BDMA. In LOCTITE 270, ISO DMA was formulated as a replacement for PEGMA, trimethylcyclohexyl methacrylate (TMCHMA) and a urethane methacrylate resin. These three formulations were evaluated on a variety of substrates including: black oxide/mild steel, zinc phosphate and stainless steel over a range of cure times from 1 hour to 168 hours. The formulations were also evaluated for performance at elevated temperatures of 150° C. and 180° C.

Figure 2:
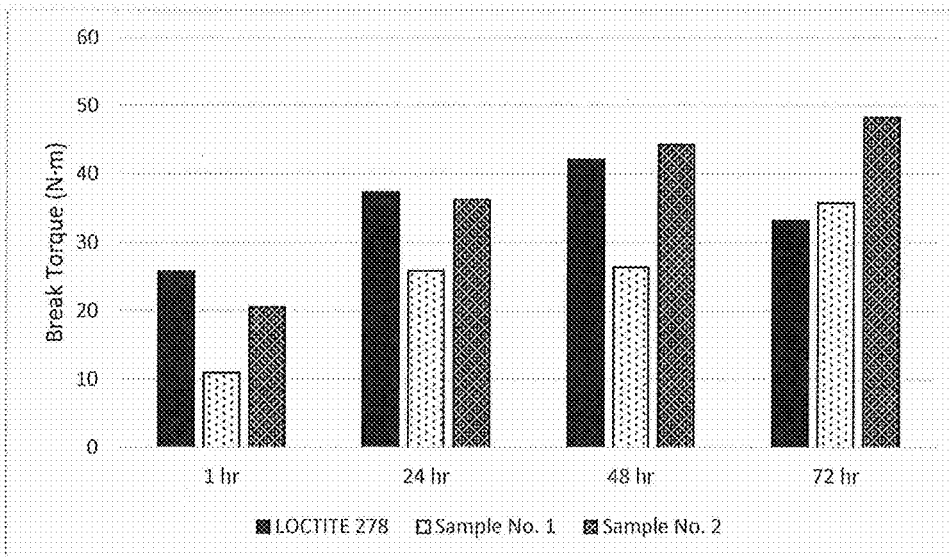
FIG. 2 depicts a plot of break torque measured on black oxide bolts mated with stainless steel nuts in N·m over time measured in hours at four different time intervals—1 hour, 24 hours, 72 hours and 168 hours—for anaerobically curable compositions, some of which having (meth)acrylate-functionalized isosorbide as a component thereof and one being the commercial product available from Henkel Corporation called LOCTITE 278.
Figure 3:
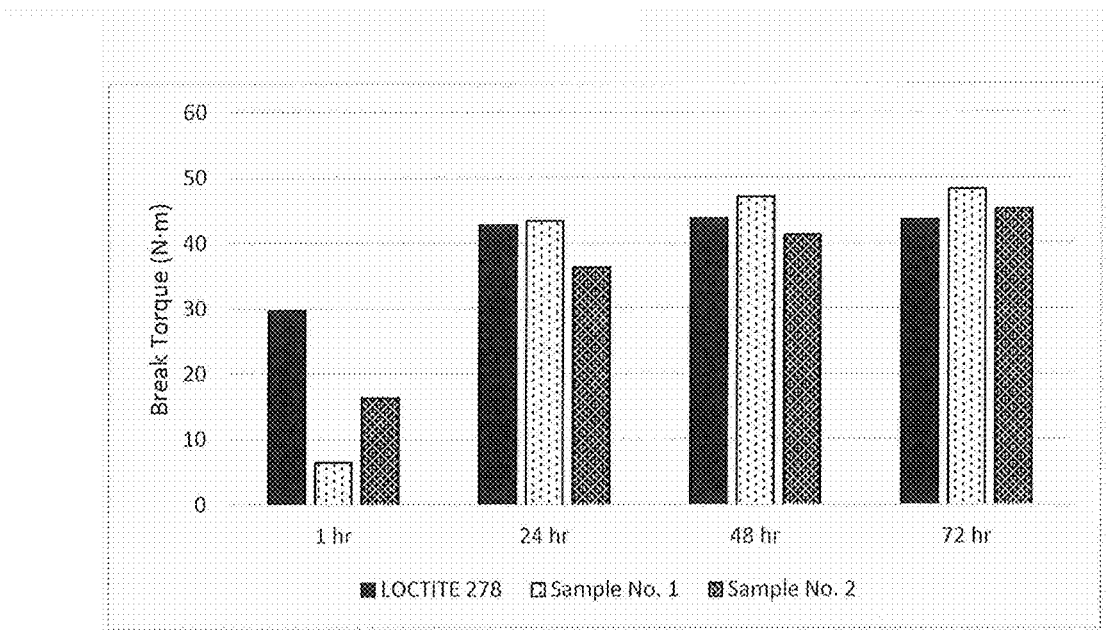
FIG. 3 depicts a plot of break torque measured on zinc phosphate nut and bolt mated assemblies in N·m over time measured in hours at four different time intervals—1 hour, 24 hours, 72 hours and 168 hours—for anaerobically curable compositions, some of which having (meth)acrylate-functionalized isosorbide as a component thereof and one being the commercial product available from Henkel Corporation called LOCTITE 278.
Figure 4:
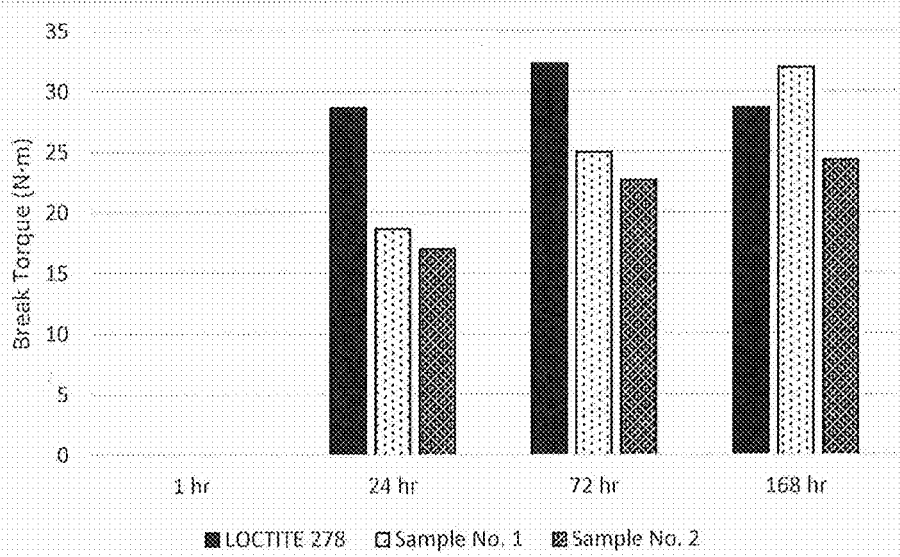
FIG. 4 depicts a plot of break torque measured on stainless steel nut and bolt assemblies in N·m over time measured in hours at four different time intervals—1 hour, 24 hours, 72 hours and 168 hours—for anaerobically curable compositions, some of which having (meth)acrylate-functionalized isosorbide as a component thereof and one being the commercial product available from Henkel Corporation called LOCTITE 278.

FIGS. 2-4 show a comparison of breakaway torque strength on black oxide/mild steel nut and bolt assemblies of ISO DMA replacing TCDMA (Sample No. 1) and both TCDMA and E2BDMA (Sample No. 2) against LOCTITE 278; on zinc phosphate of ISO DMA replacing TCDMA (Sample No. 1) and both TCDMA and E2BDMA (Sample No. 2) against LOCTITE 278; and on stainless steel of ISO DMA replacing TCDMA (Sample No. 1) and both TCDMA and E2BDMA (Sample No. 2) against LOCTITE 278, respectively.

Figure 5:
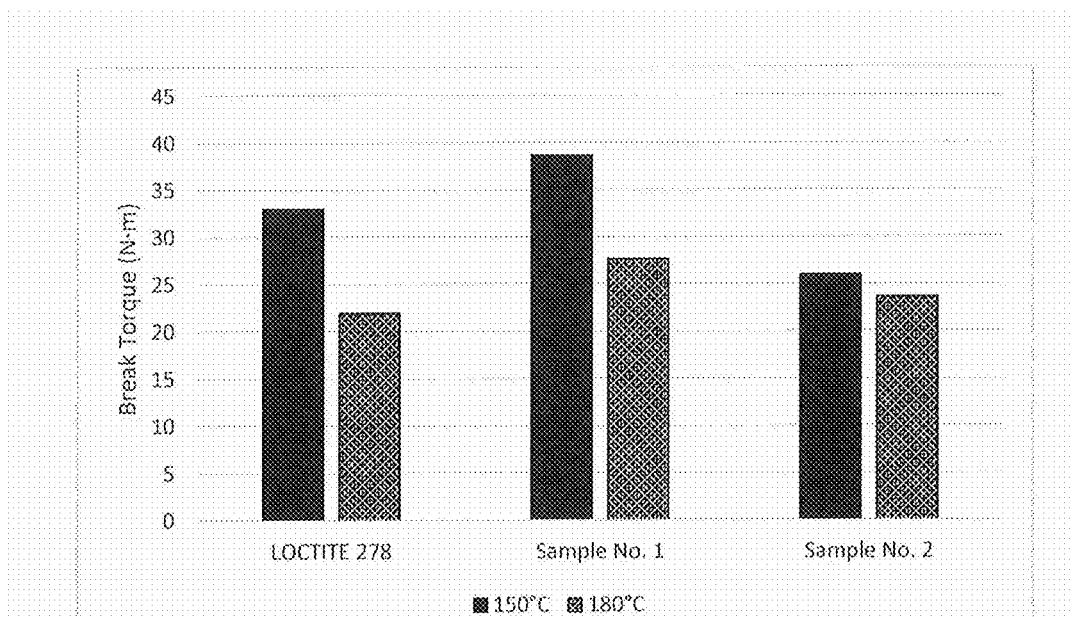
FIG. 5 depicts a plot of break torque measured in N·m at two different temperatures—150° C. and 180° C.—over time measured in minutes for anaerobically curable compositions some of which having (meth)acrylate-functionalized isosorbide as a component thereof and one being the commercial product available from Henkel Corporation called LOCTITE 278.

With reference to FIG. 5, a comparison of breakaway torque strength of bonds formed on zinc phosphate substrates (pre-torqued at 5N·m) under elevated temperature conditions of 150° C. and 180° C. for Sample Nos. 1 and 2 against LOCTITE 278 was performed.

From these figures one may determine that the presence of ISO DMA did not compromise performance on any of the substrates evaluated. In fact, Sample No. 1 outperformed LOCTITE 278 on black oxide/mild steel substrates after curing for 48 hours and 72 hours, for instance.

Sample Nos. 3, 4 and 5 included approximately 26%, 55% and 73%, respectively, of ISO DMA as a replacement for PEGMA (Sample No. 3), PEGMA and TMCHMA (Sample No. 4) and PEGMA, TMCHMA and urethane methacrylate resin (Sample No. 5). These three formulations were also evaluated on a variety of threaded substrates including: black oxide/mild steel, zinc phosphate and stainless steel over a range of time periods from 1 hour to 168 hours. The formulations were also evaluated for performance at elevated temperatures of 150° C. and 180° C.

Figure 6:
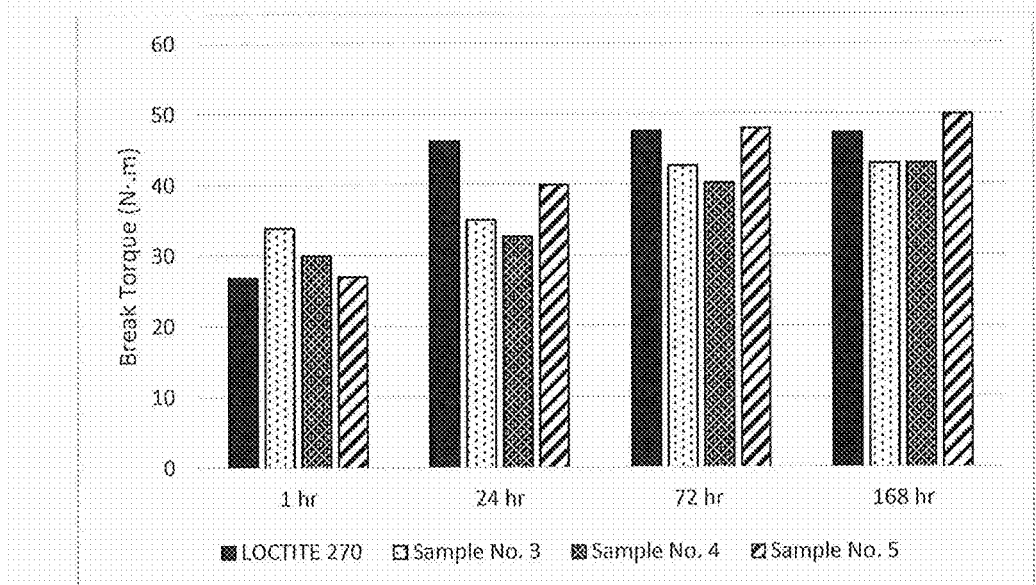
FIG. 6 depicts a plot of break torque measured on black oxide bolts mated with stainless steel nuts in N·m over time measured in hours at four different time intervals—1 hour, 24 hours, 72 hours and 168 hours—for anaerobically curable compositions, some of which having (meth)acrylate-functionalized isosorbide as a component thereof and one being the commercial product available from Henkel Corporation called LOCTITE 270.
Figure 7:
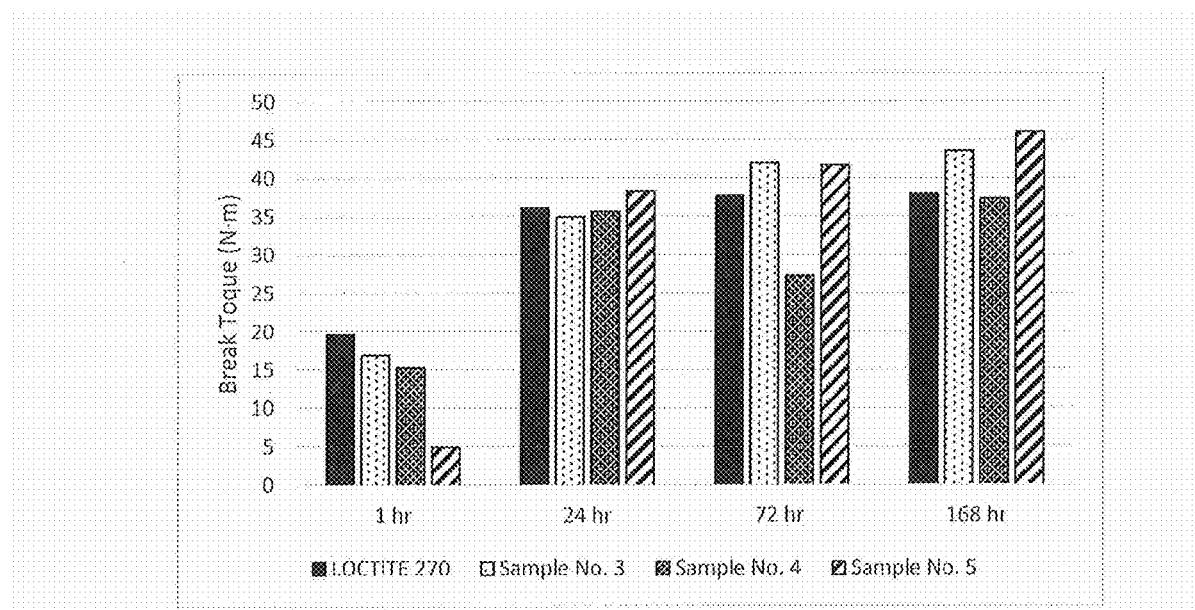
FIG. 7 depicts a plot of break torque measured on zinc phosphate nut and bolt assemblies in N·m over time measured in hours at four different time intervals—1 hour, 24 hours, 72 hours and 168 hours—for anaerobically curable compositions, some of which having (meth)acrylate-functionalized isosorbide as a component thereof and one being the commercial product available from Henkel Corporation called LOCTITE 270.
Figure 8:
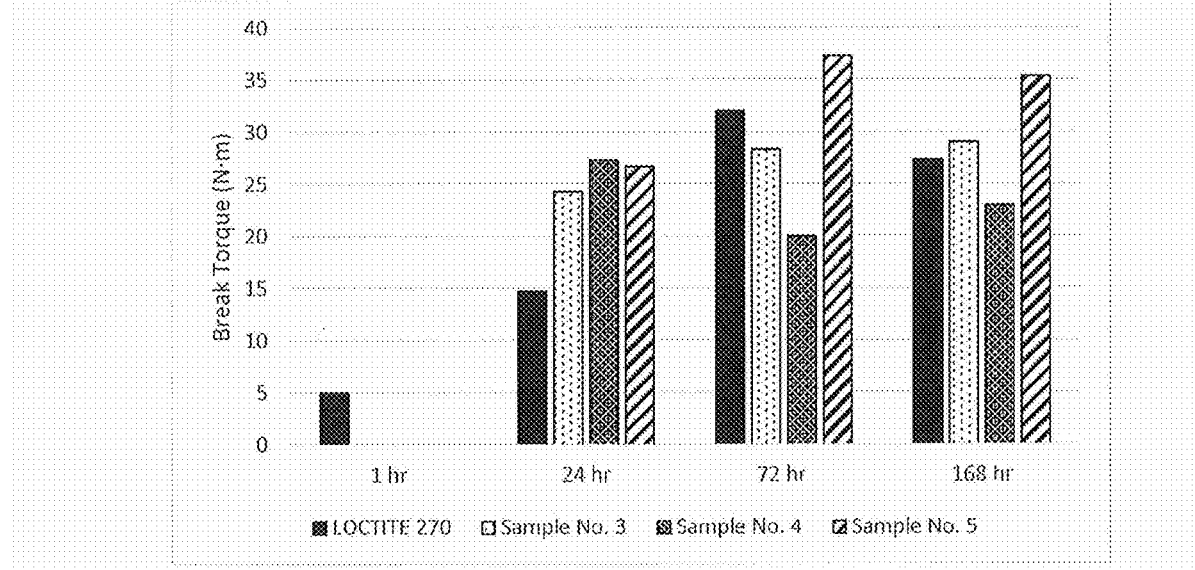
FIG. 8 depicts a plot of break torque measured on stainless steel nut and bolt assemblies in N·m over time measured in hours at four different time intervals—1 hour, 24 hours, 72 hours and 168 hours—for anaerobically curable compositions, some of which having (meth)acrylate-functionalized isosorbide as a component thereof and one being the commercial product available from Henkel Corporation called LOCTITE 270.

FIGS. 6-8 show a comparison of breakaway torque strength on black oxide/mild steel nut and bolt assemblies for these samples against LOCTITE 270; on zinc phosphate for these samples against LOCTITE 270; and on stainless steel for these samples against LOCTITE 270, respectively.

Figure 9:
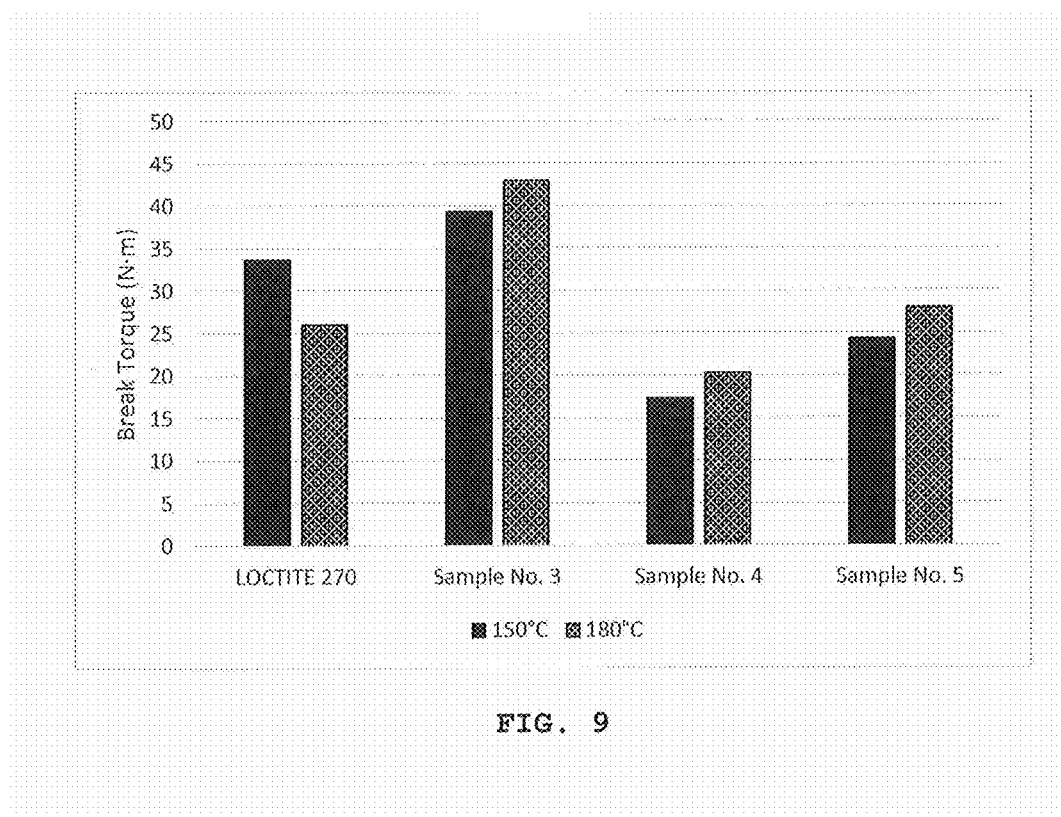
FIG. 9 depicts a plot of break torque measured in N·m at two different temperatures—150° C. and 180° C.—over time measured in minutes for anaerobically curable compositions some of which having (meth)acrylate-functionalized isosorbide as a component thereof and one being the commercial product available from Henkel Corporation called LOCTITE 270.

With reference to FIG. 9, a comparison of breakaway torque strength of bonds formed on zinc phosphate substrates (pre-torqued at 5N·m) under elevated temperature conditions of 150° C. and 180° C. for Sample Nos. 3, 4 and 5 against LOCTITE 270 was performed.

From these figures one may determine that the presence of ISO DMA did not compromise performance on any of the substrates evaluated. In fact, many of the samples, especially Sample No. 5, outperformed LOCTITE 270 on many of the evaluated substrates particularly after longer curing times.

What is claimed is:

1. An anaerobically curable composition comprising:
   at least one (meth)acrylate component;
   an anaerobic cure system; and
   (meth)acrylate-functionalized isosorbide.

2. The composition of claim 1, wherein the (meth)acrylate component is represented by $H_2C=C(G)CO_2R^1$, wherein G is a member selected from the group consisting of H, halogen and alkyl having from 1 to about four carbon atoms, and $R^1$ is a member selected from the group consisting of alkyl, cycloalkyl, alkenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

3. The composition according to claim 1, wherein the (meth)acrylate component is a member selected from the group consisting of silicone (meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran (meth)acrylates and di(meth)acrylates, hydroxypropyl (meth)acrylate, hexanediol di(meth)acrylate, and trimethylol propane tri(meth)acrylate.

4. The composition of claim 1, wherein the (meth)acrylate-functionalized isosorbide is present in an amount of about 1.0 percent to about 60.0 percent by weight of the total composition.

5. The composition of claim 1, wherein the (meth)acrylate component is present in an amount of about 50 percent to about 90 percent by weight of the total composition.

6. A method for using an anaerobically curable composition, said method comprising the steps of:
   (a) providing an anaerobically curable composition in accordance with claim 1;
   (b) providing two or more substrates, each having at least one complementary surface;
   (c) applying said anaerobically curable composition to at least one of said complementary surfaces of the substrates; and
   (d) mating said complementary surfaces of the substrates such that said anaerobically curable composition is disposed therebetween such that an anaerobic environment is present so as to permit said anaerobically curable composition to cure.

7. An anaerobic composition comprising:
   (a) a (meth)acrylate component in an amount of about 50 percent to about 90 percent by weight of the total composition;
   (b) an anaerobic cure system; and
   (c) (meth)acrylate-functionalized isosorbide in an amount of about 1.0 percent to about 60.0 percent by weight of the total composition.

8. The composition of claim 7, wherein the anaerobic cure system comprises a cure initiator in an amount of 0.1 percent to about 5 percent by weight of the total composition and a cure accelerator in an amount of about 0.1 percent to about 5 percent by weight of the total composition.

9. The composition of claim 7, wherein the (meth)acrylate-functionalized isosorbide is present in an amount of about 1 percent to about 15 percent by weight of the total composition.

10. A cured composition from the anaerobic composition of claim 7.

11. A method of preparing an anaerobic adhesive composition comprising:
   (a) forming a composition comprising at least one (meth)acrylate component and an anaerobic cure system; and
   (b) combining said composition with a (meth)acrylate-functionalized isosorbide in an amount of 1.0 percent to about 60.0 percent by weight of the total composition.

* * * * *